United States Patent
Diesnis et al.

(10) Patent No.: US 11,203,143 B2
(45) Date of Patent: Dec. 21, 2021

(54) EXTENSION DEVICE FOR THE NECK OF A CONTAINER FORMED IN A MACHINE FOR FORMING CONTAINERS FROM PREFORMS

(71) Applicant: DISCMA AG, Zürich (CH)

(72) Inventors: Daniel Diesnis, Octeville sur Mer (FR); Benoit Picot, Octeville sur Mer (FR)

(73) Assignee: Discma AG, Zürich (CH)

( * ) Notice: Subject to any disclaimer, the term of this patent is extended or adjusted under 35 U.S.C. 154(b) by 214 days.

(21) Appl. No.: 16/428,241

(22) Filed: May 31, 2019

(65) Prior Publication Data

US 2019/0283306 A1    Sep. 19, 2019

Related U.S. Application Data

(62) Division of application No. 14/782,733, filed as application No. PCT/EP2014/057163 on Apr. 9, 2014, now Pat. No. 10,350,815.

(30) Foreign Application Priority Data

Apr. 9, 2013    (EP) ..................................... 13305463

(51) Int. Cl.
*B29C 49/46*    (2006.01)
*B65B 7/28*    (2006.01)
(Continued)

(52) U.S. Cl.
CPC .............. *B29C 49/46* (2013.01); *B65B 3/022* (2013.01); *B65B 3/10* (2013.01); *B65B 7/285* (2013.01); *B65B 7/2842* (2013.01); *B65B 51/22* (2013.01); *B29C 49/06* (2013.01); *B29C 2049/224* (2013.01); *B29C 2049/465* (2013.01); *B29C 2049/4664* (2013.01);
(Continued)

(58) Field of Classification Search
None
See application file for complete search history.

(56) References Cited

U.S. PATENT DOCUMENTS

| 4,883,631 | A | 11/1989 | Ajmera |
| 2008/0029928 | A1 | 2/2008 | Andison et al. |
| 2012/0187133 | A1 | 7/2012 | Landman |

FOREIGN PATENT DOCUMENTS

| DE | 19547425 A1 | 7/1997 |
| WO | 2013/020885 A1 | 2/2013 |

OTHER PUBLICATIONS

International Search Report of PCT/US2014/057163 dated May 8, 2014.

*Primary Examiner* — Monica A Huson
(74) *Attorney, Agent, or Firm* — Eric J. Sosenko; Jonathan P. O'Brien; Honigman LLP

(57) ABSTRACT

A machine for producing a container from a preform having a body and a neck defining an inner cylindrical opening. The machine includes a container forming and filling station where the preform is placed in a mold having a molding cavity and a forming liquid is injected into the preform thereby forming and filling the container with a liquid. Prior to forming of the container, an extension device is attached to the neck of the preform thereby forming an assembly. The extension device includes a connection part for attaching to the preform and an extension part defining an inner opening extending in the continuity of the inner opening of the neck of the preform. The extension device remains attached to the neck of the preform at least during the forming and the filling of the container.

20 Claims, 6 Drawing Sheets

(51) Int. Cl.
    *B65B 3/02*            (2006.01)
    *B65B 3/10*            (2006.01)
    *B65B 51/22*          (2006.01)
    *B29L 31/00*           (2006.01)
    *B29C 49/06*           (2006.01)
    *B29C 49/58*           (2006.01)
    *B29C 49/22*           (2006.01)
    *B29K 101/12*         (2006.01)

(52) U.S. Cl.
    CPC .. *B29C 2049/5862* (2013.01); *B29K 2101/12* (2013.01); *B29L 2031/7158* (2013.01)

EXTENSION DEVICE FOR THE NECK OF A CONTAINER FORMED IN A MACHINE FOR FORMING CONTAINERS FROM PREFORMS

CROSS-REFERENCE TO RELATED APPLICATIONS

This application is a divisional of U.S. application Ser. No. 14/782,733 filed on Oct. 6, 2015, which is a U.S. national phase of International Application No. PCT/EP2014/057163 filed on Apr. 9, 2014, and claims priority to EP13305463.5 filed on Apr. 9, 2013, the disclosures of which are herein incorporated by reference in their entirety.

TECHNICAL FIELD OF THE INVENTION

The present invention relates to method for producing a container from a preform by injecting a liquid inside successive preforms placed in successive molds.

The invention also relates to a machine for producing containers from preforms and to an assembly comprising a preform or a container and an extension device for implementing such a method.

The invention relates to the field, known as hydro forming, of forming containers from a preform using an incompressible liquid to deform the preform.

In the application, "liquid" has a physical meaning. It designates any incompressible and able to flow medium. The liquid can have a low viscosity (like water or alcohol), a medium viscosity (like eatable oil or soup), or a high viscosity (like yoghurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

It is known to produce containers, such as plastics bottles and similar, from preforms which are formed into the containers in a molding cavity of a mold by injecting a gaseous or liquid forming fluid in the preforms.

The preforms are placed in successive molds and the injection is performed at a container forming station comprising a wheel, or carousel, movable in rotation and carrying the molds. The injection is performed at a high pressure via an injection nozzle which is placed over the neck, or introduced in the neck, of the preforms.

However, the high pressure of the injection can deform the neck of the preforms, which then forms a container of poor quality, which has to be rejected. The number of unsatisfactory containers due to neck deformation reduces the throughput of the machine.

In the case of a liquid forming fluid, the liquid intended to fill the container is directly injected in the preform at the container forming station and participates to the forming of the container. The container containing the liquid is then moved at high speed to the closing station where a lid or a cap is applied to the container. This forming method is known as hydraulic forming.

The containers are transported at high speed while containing liquid. More particularly, the containers containing liquid are moved in rotation, which generates an important centrifugal force on the containers. This centrifugal force, and more generally transporting the containers at high speed, can lead to spilling the liquid contained in the containers. When the molds are in mold holders, arranged to close and lock the molds, the spilled liquid will soil the mold and the mold holder. However, the mold holder is hard to clean due to its complicated structure, and cleaning the mold holder implies stopping the rotation of the wheel and therefore reduces the throughput of the forming station. An insufficient cleaning of the molds and mold holders can lead to cross-contamination in the hydraulic forming method. Consequently, the speed of rotation of the wheel is necessarily limited in order to avoid the above-mentioned problems.

WO-2013/020885 discloses a machine and a method for forming and filling containers using a liquid. In this machine, the longitudinal axes of the forming stations are inclined at 45° relative to the vertical axis of rotation of the forming stations. This document explains that this inclination makes it possible to avoid splashing and spilling of the liquid due to the centrifugal force exerted on the liquid in motion.

However, such a machine has a complicated structure and can lead to difficulties for placing the preforms in the molds and for retrieving the formed and filled containers from the molds.

Consequently, an alternative method for preventing spilling of liquid is needed.

DE-195 47 425 discloses a method for forming containers, wherein a device is attached to the neck of a preform to guide a forming gas inside the preform during forming of the container from the preform. However, this document does not mention the problem of preventing the spilling of the liquid once the container has been filled and does not disclose a solution to this problem. US-2012/0187133 also does not disclose this problem and an appropriate solution to it.

One of the aims of the invention is to overcome the drawbacks mentioned above, by proposing a device able to prevent the deformation of the neck of the preforms during injection and to limit the risks of spilling the liquid contained in the formed containers.

SUMMARY OF THE INVENTION

To this end, the invention relates to a machine for producing containers from preforms, the preforms each comprising a body and a neck, said neck defining an inner cylindrical opening extending along an axis A, the machine comprising at least: a container forming and filling station for forming and filling the containers with a liquid, the forming station comprising an injection nozzle for injecting a liquid inside the preforms and a mold defining a molding cavity having the shape of the container to be produced, the preforms being each placed within the mold such that the injection of the liquid deforms the preforms, which acquire the shape of the molding cavity and such that the liquid fills the formed container; a plurality of extension devices, each extension device comprising an extension part extending along axis A of the preform and defining an inner opening extending in the continuity of the inner cylindrical opening of the neck when the extension device is attached to the neck of a preform, the injection nozzle being arranged to inject the liquid through the inner opening of the extension device in a fluid tight manner; and an extension device attaching station configured to place or attach an extension device on the neck of each preform, the extension device attaching being located upstream of the container forming and filling station.

The machine according to the invention can be used safely, without risks of soiling the elements of the machine since the extension device prevents any spilling of the liquid injected in the container.

According to an embodiment of the machine according to the invention, the machine further comprises a wheel movable in rotation arranged to drive in rotation the container forming station, the length of the extension part of the extension device being arranged such that the liquid, injected in the container, is not spilled over the extension part of the extension device under the influence of the centrifugal force imparted on the liquid by the rotation of the wheel.

The throughput of the machine can be increased by safely increasing the rotation speed of the wheel since the extension device is arranged to prevent in a simple manner spilling under the influence of the centrifugal force imparted on the liquid by the rotation of the wheel.

According to other features of the machine according to the invention: the extension device attaching station comprise a head for screwing or clipping or driving fitting or interference fitting the extension device on the neck of each preform; the machine comprises, downstream of the forming and filling station, an extension device detaching station arranged to remove the extension device from the neck of the container and to transfer the extension devices between the extension device detaching means and the extension device attaching means; the machine comprises a plurality of neck holding parts, each neck holding part being arranged to hold a preform or a container by its neck, the extension device attaching station comprising an anti-spilling actuator arranged to move each extension device relative to a corresponding neck holding part between an anti-spilling configuration, wherein the extension device is placed on the neck of a preform, and a retrieved configuration, wherein the extension device is moved away from the neck holding part for retrieving the extension device from the neck of a preform.

The invention also relates to an assembly comprising an element and an extension device attached to the element, the element being a container or a perform and comprising at least a neck defining an inner cylindrical opening extending along an axis A, the extension device comprising a connection part and an extension part, the connection part comprising attaching means to the neck of the element, the extension part and the connection part defining an inner cylindrical opening extending along the axis A in the continuity of the inner opening of the neck, characterized in that the length of the extension part along axis A is greater than the diameter of the inner cylindrical opening of the neck, in particular at least 2 times the diameter of the inner cylindrical opening of the neck.

As mentioned previously, the extension device protects the neck of the preform and container and prevents the risks of spilling the liquid injected in the preform or in the container by extending the length of the neck. The preform or container can then be moved at a high rotation speed while containing a liquid, which improves the throughput of the machine using an assembly according to the invention.

According to a feature of the assembly, a shoulder extends substantially radially inside the inner opening between the connection part and the extension part of the extension device, said shoulder resting on the upper end of the neck of the element.

The shoulder forms a sealing between the extension part of the extension device and the connection part and the outer collar of the neck, thereby preventing liquid from leaking on the neck during transportation of the assembly in the machine for forming containers. Furthermore, the shoulder forms an abutment stopping the extension device when it is being attached to the preform to correctly position the extension device on the preform. Furthermore, the shoulder forms an abutment for the injection nozzle of the machine, ensuring a proper positioning of the nozzle during the injection and filling steps of the method according to the invention.

According to a feature of the assembly, the extension part is delimited by a wall, surrounding the inner cylindrical opening, the wall being tapered such that the inner cylindrical opening has conical shape in the extension part.

Such a conical shape of the inner cylindrical opening prevents liquid from being trapped in the extension device and ensures that any liquid present in the extension part will flow from said central bore towards the inner opening of the neck.

According to a feature of the assembly, the extension part of the extension device is made of a material adapted to be folded and welded on itself. Providing an extension part made of a material adapted to be folded and welded on itself, the extension device can be used to form a cap of the container as explained previously in relation to the method according to the invention.

According to a feature of the assembly, at least the extension part of the extension device is made of a hydrophobic material or is coated with such a hydrophobic material.

This feature guaranties that the liquid flowing in the extension part of the extension device will flow inside the preform or formed container and not remain in the extension device.

The invention also relates to a combination of a machine and an assembly for forming containers. The assembly includes a preform and an extension device. The preform has a body and a neck, with the neck defining an inner cylindrical opening extending along an axis. The extension device is attached to the preform and includes a connection part and an extension part. The connection part is in engagement with the neck of the preform and extends along the axis of the preform to define an inner opening extending in the continuity of the inner cylindrical opening of the neck of the preform. The machine includes a container forming and filling station and an extension device attaching station. The extension device attaching station is configured to attach the extension device onto the neck of the preform thereby forming the assembly. The container forming and filing station includes an injection nozzle and at least one mold, wherein the injection nozzle is configured to inject a liquid into the preform through the extension device when coupled to the extension device in a fluid tight manner. The at least one mold defines a mold cavity in the shape of the container to be formed from the preform and is configured to receive the preform such that the injection of the liquid deforms the preforms into a container in the shape of the mold cavity and fills the container.

Other aspects and advantages of the invention will appear upon reading the following description, given by way of example and made in reference to the appended drawings, which are noted below.

DETAILED DESCRIPTION OF THE INVENTION

In the following description, the machine and method according to the invention will be described in relation with a hydraulic forming method of containers. In the following description, the assembly according to the invention is formed by an element comprising a neck and an extension device attached on the neck of the element. The element is a preform or a container depending on the step of the method being described.

In the description, the terms "upstream" and "downstream" are defined relative to the direction of circulation of the preforms and of the formed containers in the machine according to the invention.

The terms "upper" and "lower" are defined relative to axis A, which corresponds to the axis of the container to be produced and which extends substantially vertically when the container is placed on its bottom.

Figure 2:
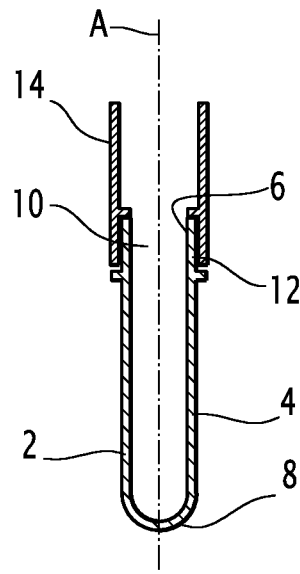
FIG. 2 is a cross-section view of an assembly according to the invention showing a preform for forming a container with the extension device of FIG. 1 attached to the preform.

The invention relates to the technical field of forming containers 1, such as bottles, for example sterile or aseptic bottles containing water or carbonated water based drinks, starting from preforms 2, shown for example in FIG. 2.

Each preform 2 is made of plastics material, for example of polyesters, such as polyethylene terephthalate (PET), polyethylene naphthalate (PEN), polyethyleneimine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC). Each preform 2 comprises a body 4 in the general shape of a tube of U-shaped longitudinal section, which is closed at one end and the other end of which already has the final shape of the neck 6 of the container 1. In FIG. 2, a preform 2 is shown, by way of non-limiting example, having a cylindrical body 4 extending along a substantially vertical axis A which coincides with the axis of the neck 6. The lower end 8 of the body 4 is closed and has the general shape of a hemisphere, while the upper end of the preform 2 forms the neck 6, which defines an inner opening 10 and which is, in this case, provided with an outer radial collar 12 adapted to receive a lid or a cap for example by screwing. The preforms 2 are generally produced according to an injection molding process and molded at a site different from the site where the machine for forming containers 1 is located.

Figure 8:
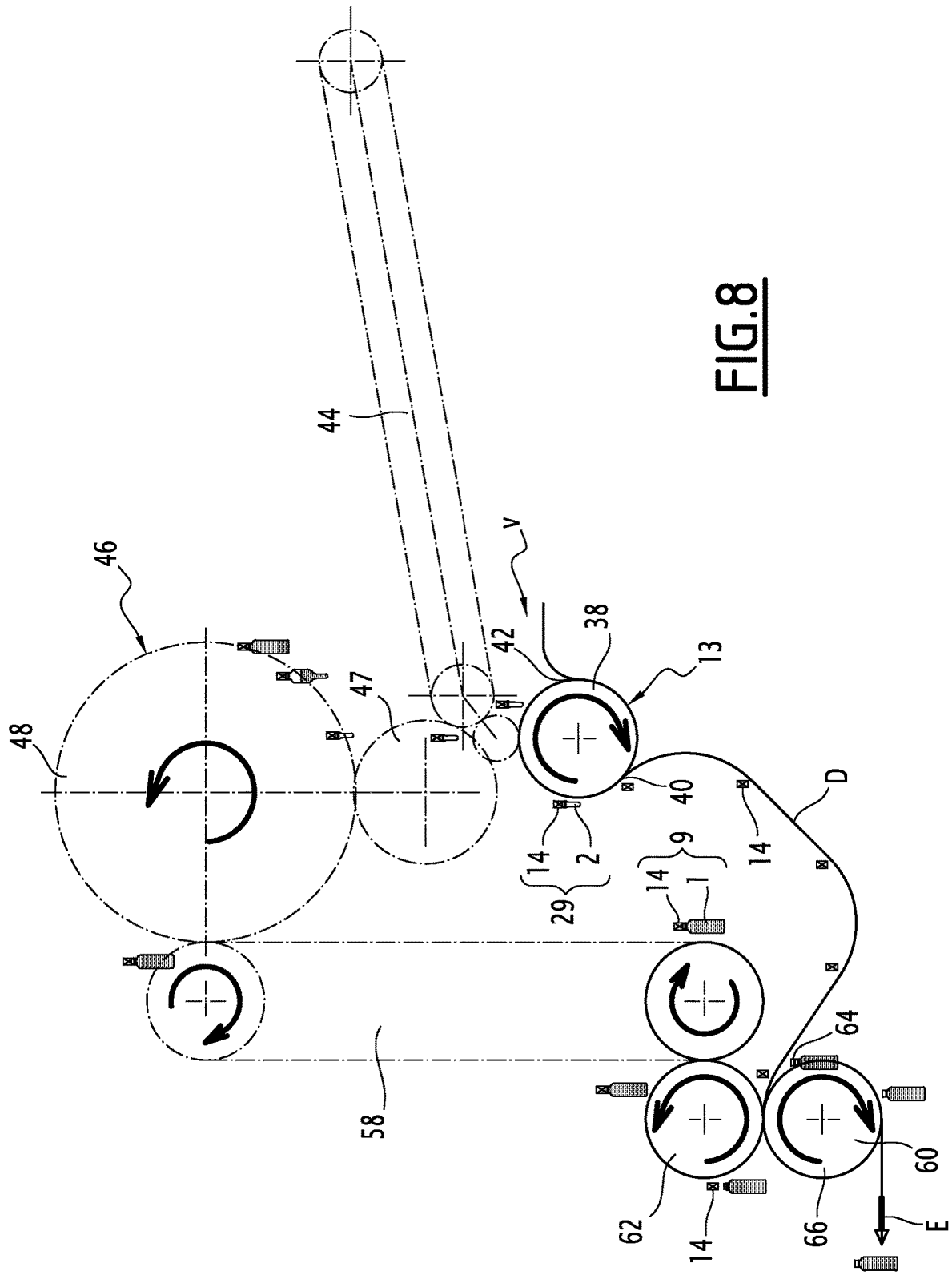
FIG. 8 is a diagrammatical view from above of a machine for forming containers according to one embodiment of the invention.

According to a first embodiment of the machine, successive preforms 2 are introduced in the machine shown in FIG. 8 and are introduced in an extension attaching station 13 for attaching an anti-spilling device to neck 6 of each preform 2. The anti-spilling device is for example made of a hydrophobic material or is coated with such a hydrophobic material for guarantying the return of the liquid inside the container 1 during the forming and filling of said container.

According to the first embodiment, the anti-spilling device is intended to be attached to the preform such that the anti-spilling device is moved with the preform and with the formed container obtained after a forming and filling process has been performed on the preform and follows the path of the preform from the extension attaching station 13, to a extension detaching station or to a station for shaping the anti-spilling device into a cap, as will be described subsequently.

According to the first embodiment, the anti-spilling device is formed of an extension device 14 of general cylindrical shape and is for example made of a single piece of plastics material According to an embodiment, the material of the extension device 14 is material adapted to folded and welded on itself. The extension device 14 has the general shape of a tube opened at both ends.

Figure 1:
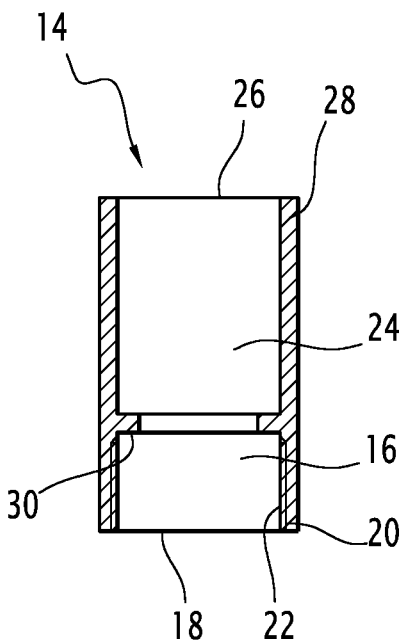
FIG. 1 is a cross-section view of respectively an extension device for an assembly according to the invention.

According to the first embodiment, the extension device 14 comprises a connection part 16 adapted to be attached to the neck 6 of a preform. To that end, the connection part 16 comprises an inner opening 18 defined by a wall 20 having a shape substantially complementary to the shape of the outer face of the neck 6, i.e. of the radial collar 12 in the embodiment shown in FIG. 1. Consequently, the diameter of the inner opening 18 is substantially equal to the diameter of the neck 6. In the case of a radial collar 12 adapted for receiving a cap by screwing, the wall 20 comprises an inner threading 22 extending in the inner opening 18 and adapted to be screwed on the radial collar 12 for attaching the extension device 14 to the neck 6 of the preform 2. Alternatively, the connection part 16 could be force fitted on the neck 6, which can have a smooth outer face. When the extension device 14 is attached to the neck 6, the inner opening 18 of the connection part 16 and the inner opening 10 of the neck 6 are substantially coaxial and extend along axis A.

The extension device 14 further comprises an extension part 24 extending in the continuity of the connection part 16 and comprising an inner opening 26, defined by a wall 28, coaxial with the inner opening 18 of the connection part 16. According to a first variant shown in FIGS. 1 to 4, the diameter of the inner opening 26 of the extension part is substantially equal to the diameter of the inner opening 18 of the connection part 16. However, the diameter of the inner opening 26 can be larger than the diameter of the inner opening 18 of the connection part in order to receive larger nozzles, as will be described later. The inner face of the wall 28, surrounding the inner opening 26, is for example substantially smooth. According to an embodiment, at least the extension part 24 of the extension device 14 is made of a hydrophobic material or is coated with such a hydrophobic material.

A shoulder 30 extends radially in the inner opening of the extension device 14 between the connection part 16 and the extension part 24. Opposite the shoulder 30, the diameter of the inner opening of the extension device 14 is reduced, such that said diameter is less than the diameter of the inner opening 18 of the connection part 16 and less than the diameter of the inner opening 26 of the extension part 24. The dimension of the shoulder 30 in a radial plan is substantially equal to the thickness of the neck 6 in said radial plan. Therefore, when the connection part 16 is attached to the neck 6, the shoulder 30 rests on the upper end of the neck 6 and forms an abutment stopping the extension device 14 when it is being attached to the preform 2, thereby preventing the extension part 24 of the extension device 14 of reaching the neck 6. Furthermore, the shoulder 30 forms a seal between the inner volume of the extension part 24 and the space between the outer face of the neck 6 and the wall 20 of the connection part 16 of the extension device 14, thereby preventing any liquid from liquid in this space, when the liquid is in the inner volume of the extension part 24.

Figure 5:
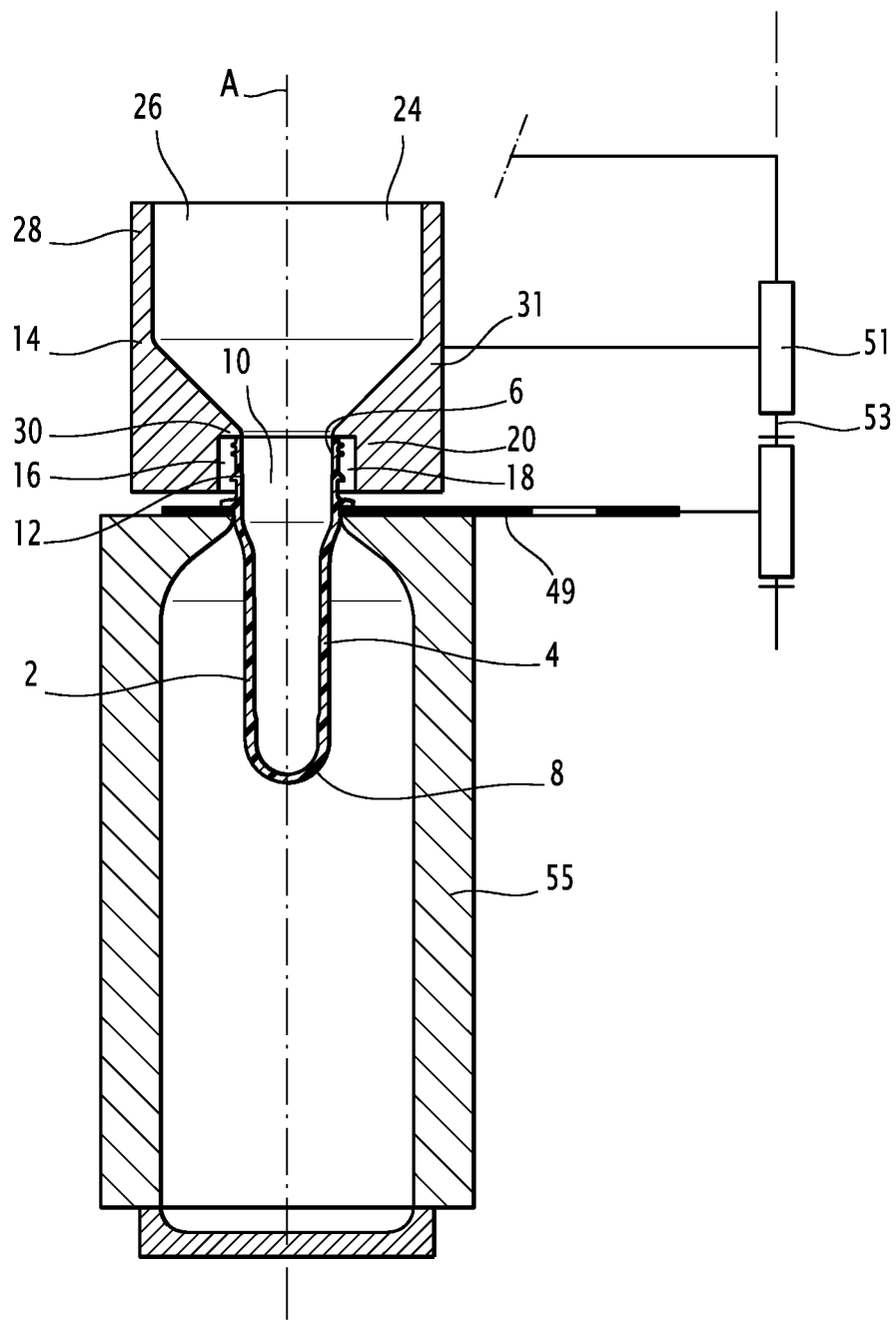
FIG. 5 is a cross-section view of an assembly according to another embodiment of an extension device placed on the preform placed in a mold.
Figure 6:
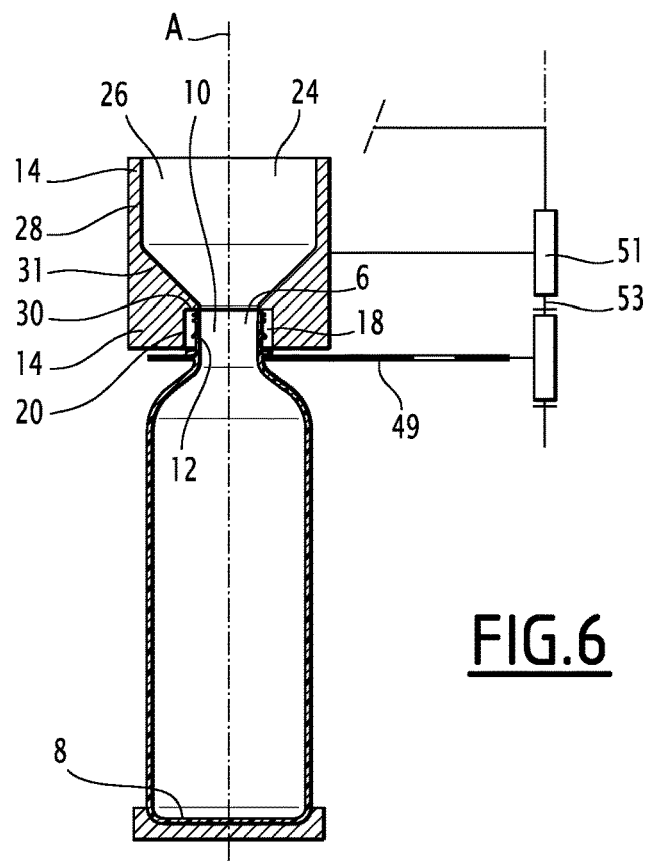
FIG. 6 is a cross-section view of the assembly of FIG. 5, wherein the preform has been shaped into a container.
Figure 7:
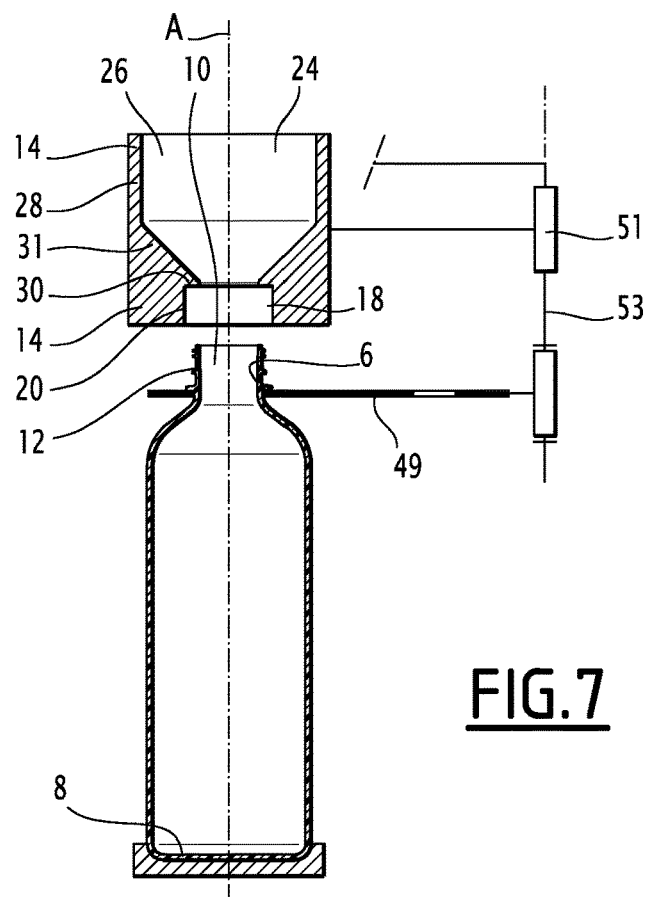
FIG. 7 is a cross-section view of the assembly of FIG. 6, wherein the extension device has been spaced from the neck of the container.

According to a second variant, shown in FIGS. 5 to 7, the diameter of the inner opening 26 of the extension part 24 is larger than the diameter of the inner opening 18. Furthermore, the inner face of the wall 28 defining the inner opening 26 of the extension part 24 is tapered such that the inner opening of the extension part 24 has a conical shape in the vicinity of the connection part 16. The wall 28 defining the inner opening 26 therefore comprises a conical part 31, having a small diameter defined by the diameter of the inner opening opposite the shoulder 30 and a large diameter defined by the diameter of the inner opening near the upper end of the extension part 24, i.e. the end of the extension part 24 opposite the connection part 16. The conical part 31 of the extension part 24 guaranties that the liquid will flow inside the container 1 and will not remain trapped in the extension device 14.

It should be noted that the first variant and the second variant can be applied to the first embodiment, as well as to the second embodiment described subsequently.

When the extension device 14 is attached to the preform 2, the extension part 24 extends over the connection portion 16 substantially in the continuity of the neck 6 in order to extend the length of the neck 6, as shown in FIGS. 1 to 7. The length of the extension part 24 along the axis of its inner opening 26, i.e. according to axis A when the extension device 14 is attached on the preform 2, is larger than the diameter of the inner opening 10 of the neck, and is for example at least two times the diameter of the inner cylindrical opening 10 of the neck 6. More precisely, the length of the extension part 24 is for example comprised between two times the diameter of the inner cylindrical opening 10 of the neck 6. The length of the extension part 24 is for example in the range of 10 and 100 mm, while the neck of the preform 2 is typically in the range of 5 and 15 mm. Therefore, when the extension device 14 is attached to the neck, the total length of the part extending over the body 4 of the preform is in the range of 15 and 115 mm. The length of the extension device 14 is chosen relative to the different speeds of the machine. The greater the speeds of the machine are, the longer the extension device 14 has to be.

When the extension device 14 is attached to the neck 6 of the preform 2, the inner opening 10 of the neck 6 remains accessible via the inner openings 26 and 18 of the extension part 24 and of the connection part 16 of the extension device 14. The openings 26 and 18 of the extension part 24 and of the connection part 16 of the extension device 14 define together a cylindrical inner opening extending through the extension device. The lower end of the inner opening of the connection part 16 forms the opened lower end of the extension device 14 and the upper end of the extension part 24 forms the opened upper end of the extension device 14.

Figure 9:
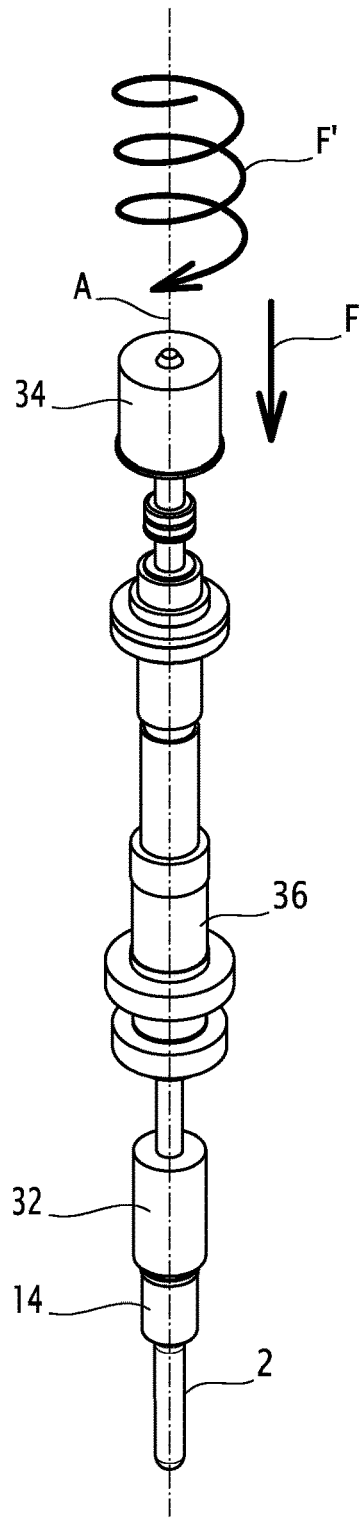
FIG. 9 is a diagrammatical perspective view of the extension attaching means of the machine of FIG. 8.

According to the first embodiment, the extension attaching station 13 is arranged to attach an extension device 14 as described above on each preform 2, prior to its deformation to form a container. To this end, the attaching station comprises means for attaching an extension device 14 on the neck 6 of the preforms 2, as shown in FIG. 9. For example, when the collar 12 of the neck 6 and the connection part 16 are intended to be screwed together, the means for applying the extension device 14 are able to move the extension device 14 in rotation around axis A above the preform 2 in order to screw the connection part 16 on the neck 6 of the preform 2 until the shoulder 30 comes in abutment on the upper end of the neck 6. Such means are for example similar to the known means for screwing a cap or a lid on the containers 2. Such means comprise for example a head 32 adapted to pick up an extension device 14 by the outer face thereof and to move in translation and in rotation along and around axis A, as shown by arrows F and F' of FIG. 9 respectively. The movement in translation and in translation is for example controlled by a motor 34 arranged to move a cylinder 36 in translation and in rotation along and around axis A.

Alternatively, the means for attaching the extension device 14 to the neck 6 of a preform 2 can be adapted to attach the extension device 14 by clipping. In this case, the head is simply moved in translation along the axial direction and pushes the extension device 14 until it is engaged on the neck 6 of the preform. Alternatively, the means for attaching the extension device 14 to the neck 6 of a preform 2 can be adapted to attach the extension device 14 by driving fitting or interference fitting.

The extension attaching station 13 comprises a wheel 38, or carousel, carrying a plurality of such heads 32 distributed on its periphery and placed above imprints, each being adapted to carry a preform 2, each head 32 being movable as described above relative to the corresponding imprint and to the wheel 38.

The wheel 38 of the attaching station 13 is movable in rotation around an axis substantially parallel to the axis A of the preform 2, i.e. a substantially vertical axis. During the rotation of the wheel 38, a head 32 is adapted to pick up an extension device 14 at an extension device feeding spot 40 and is placed above an imprint having picked up a preform 2 at a preform feeding spot 42, where a preform 2 is placed in the imprint. The wheel continues its rotation while the head 32 applies the extension device 14 on the neck 6 of the preform. When the extension device 14 is attached to the preform 2, said preform 2 faces the inlet of an oven 44. Therefore, the extension attaching station 13 continuously assembles assemblies 29, each made of a preform 2 equipped with an extension device 14. The successive assemblies 29 are continuously transferred to the oven 44.

The assembly 29 then undergoes a step of heating in the oven 44, or heating station. In a conventional manner, the assemblies 29 are successively loaded on a carrier, forming a closed loop, circulating within the oven 44. During the passage of the assemblies 29 within the oven, the preforms 2 are continuously heated up to a temperature compatible with their subsequent deformation into containers. Such an oven 44 and heating step are conventional in methods and machines for producing containers and will not be described in greater detail here. At the outlet of the oven, the preforms are transferred to a container forming station 46, via a transfer wheel 47.

It should be noted that the extension attaching station 13 has been described as extending upstream of the oven 44, as shown in FIG. 8. Such an embodiment is advantageous in that the extension device 14 protects the neck 6 of the preform 2 during the heating step. However, according to a particular embodiment, the extension attaching station 13 is placed downstream of the oven, at the outlet of said oven. Such an embodiment enables to maintain the extension device 14 at a constant temperature and prolongs its duration in time. Alternatively, the extension device attaching means could be integrated in the container forming station 46 and not be provided on a distinct station as described above.

According to a second embodiment, shown in FIGS. 5 to 7, the anti-spilling device is intended to be placed on the neck of a preform without being attached to it.

The extension attaching means are arranged to place the extension devices 14 on the neck 6 of the preforms, without attaching the extension devices on the necks 6. In this case, the diameter of the inner opening 18 of the connection part 16 is larger than the outer diameter of the neck 6 and the shoulder 30 resting on the end of the neck 6 of the preform 2 is arranged to form a seal between the inner volume of the extension part 24 and the space between the outer face of the neck 6 and the wall 20 of the connection part 16 of the extension device 14, thereby preventing any liquid from liquid in this space, when the liquid is in the inner volume of the extension part 24.

According to the second embodiment, each extension device 14 is attached to a neck holding part 49 arranged to hold a preform and the resulting formed container by its neck 6 at least during the forming and the filling of the container.

The neck holding part 49 is for example formed by a neck holding fork, for example formed by two branches movable relative to each other between an opened position, wherein the branches are spaced from each other such that a preform 2 can be inserted between the branches and a container 1 can be retrieved from the neck holding fork, and a closed position, wherein the branches are moved close from each other such as to encircle the preform 2 or the container 1 underneath its neck 6. In this case, the neck holding part 49 is arranged to pick up a preform 2 at the entry of the machine, or at the outlet of the oven, and to release the resulting formed and filled container at the exit of the machine. Between the entry and the exit of the machine, the neck holding part 49 is arranged to maintain the preform in a mold and forms part of the molding cavity as shown in FIG. 5. In this case, the assembly 29 is formed by a preform 2, by the neck holding part 49 and by the extension device 14.

According to a variant, the neck holding part 49 can be formed by the mold itself.

Each extension device 14 is movable relative to the neck holding part 49 to which said extension device 14 is attached along axis A between a retrieved configuration (FIG. 7), wherein the extension device is spaced from the neck holding part 49 when a preform is introduced in said neck holding part or when a container is retrieved from said neck holding part, and an anti-spilling configuration (FIGS. 5 and 6), wherein the extension device 14 is placed on the neck of the preform 2 at least during the forming and the filling of a container from a preform. Such an embodiment is particularly advantageous in that the extension device 14 can be guided on the preform 2 relative to the neck holding part 49 to properly align the axis of the inner opening of the extension device 14 with the axis A of the preform 2.

The movement of the extension device 14 relative to the neck holding part 49 is controlled by appropriate actuator(s) 51 and connecting rod(s) 53 extending along axis A, connecting the extension device 14 to the neck holding part 49.

According to the second embodiment, the preform is moved to the container forming station 46 from the oven by a neck holding part 49, when the neck holding part 49 has picked up the preform at the entry of the machine or at the outlet of the oven, without passing by an extension attaching station. When the neck holding part 49 is formed by the mold itself, the preforms is moved to the container forming station 46 in a conventional manner, without passing by an extension attaching station. When the preform enters the container forming station and is placed in a mold, as described below, the extension device 14 is placed on the neck 6 of the preform 2. Conventionally, the container forming station 46 comprises a wheel 48, movable in rotation around an axis substantially parallel to the axis A of the preform 2, i.e. a substantially vertical axis, carrying a plurality of mold holders distributed on its periphery, each mold holder receiving a mold 55 (shown in FIG. 5).

A mold comprises at least two parts movable relative to each other, between an opened position and a closed position. The two parts are for example hinged together and are movable in rotation relative to each other around an axis substantially parallel to the axis A of the preform 2. Each part comprises a body comprising a hollow recess having the shape of a half bottle to be formed. According to a non-limiting example, the hollow recess of one part comprises a semi-cylindrical portion, closed at its lower end by a bottom surface having a the shape of a semi-circle, and terminated at its upper end by a tapered, then semi-cylindrical collar of a shape substantially complementary to the shape of half of the body 4 of the preform 2. The hollow recess of the other part of the mold is symmetrical to the hollow recess described above. According to another example, shown in FIG. 5, the bottom surface is formed by a third part of the mold and/or the collar of the mold is terminated by a neck holding fork, which forms a complementary part of the molding cavity, with the two or three parts of the mold.

In the opened position, the parts of the mold are separated from each other such that the preform 2 of the assembly 29 can be introduced between the two parts, when the assembly 29 is transferred to the container forming station 46 from the oven 44 or from the extension attaching station 13.

In the closed position, the two or more parts are applied against each other, such that the hollow recesses face each other and define together a molding cavity having the shape of the container 1 to be formed. The molding cavity therefore comprises a cylindrical portion, defined by the semi-cylindrical portions of the recesses and intended to form the body of the container 1, closed at its lower end by a circular bottom surface, formed by the bottom surfaces of the recesses and intended to form the bottom of the container, and terminated at its upper end by a collar, substantially complementary to part of the body of the preform 2. When the mold is closed, the preform 2 is held in the molding cavity by the collar of the molding cavity. The collar holds the preform 2 just below the neck 6 of the preform, which extends above the collar of the molding cavity outside of said cavity, with its extension device 14 protruding from the mold. The molding cavity is hermetically closed with the preform 2 extending inside the molding cavity. The inner opening 10 defined by the neck 6 of the preform 2 remains accessible through the extension device 14.

In a known way, each mold holder is arranged to be able to move the mold between its opened and closed positions and to lock the mold in the closed position, preventing the mold to move towards the opened position when said mold is locked by the mold holder. The mold holders carrying the mold are movable in rotation with the wheel 48.

Figure 3:
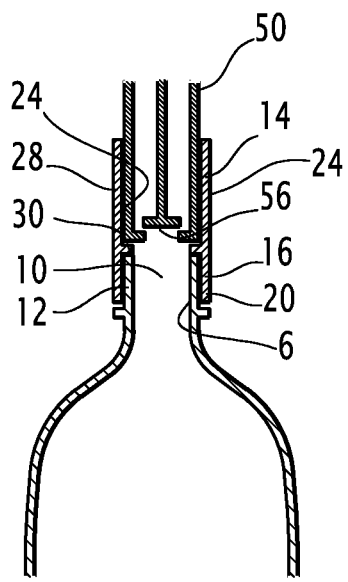
FIG. 3 is a cross-section view of part of the preform of FIG. 2 with an extension device during the injection of a forming liquid in the preform.
Figure 4:
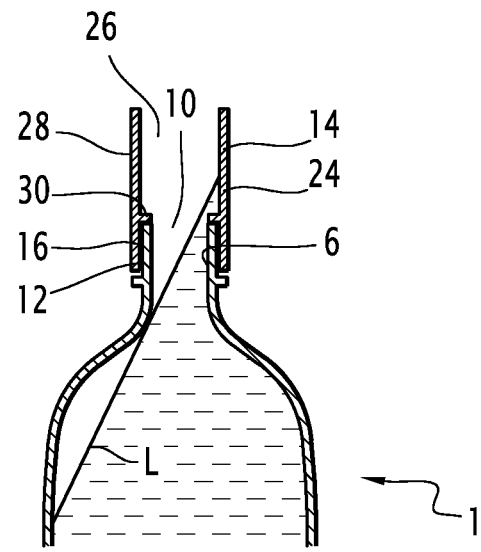
FIG. 4 is a cross-section view of part of a container with an extension device and containing a liquid, during a rotational movement of the container.

As shown in FIG. 3, the container forming stations are each further equipped with injection nozzles 50 adapted to inject a liquid in the preforms 2 held by the molds and mold holders. Such injection nozzles 50 are known per se and will not be described in detail herein. Each nozzle 50 comprises an outlet 56, which is in fluidic communication with the inner opening 10 of the neck 6. The fluidic communication is established by connecting the injection nozzle 50 with the preform in a fluid tight manner, meaning that liquid flowing through the injection nozzle flows inside the preform and not outside said preform.

In order to place the outlet 56 of the nozzle 50 in fluidic communication with the inner opening 10 of the neck 6 and to establish a fluid tight connection between the injection nozzle 50 and the preform, the nozzle 50 is for example fitted in the extension part 24 of the extension device 14, the outlet 56 of the nozzle 50 being in abutment against the shoulder 30 of the extension device 14, as shown in FIG. 3. To this end, the nozzle 50 is for example substantially cylindrical and has an outer diameter substantially equal to the diameter of the inner opening 26 of the extension part 24 of the extension device 14 and is adapted to be fitted in the extension part 24 of the extension device 14 by moving it in translation along axis A.

In the case of hydraulic forming, the injection nozzle 50 is for example arranged to inject water in the preforms 2, which are deformed and acquire the shape of the molding cavity, i.e. the shape of the containers 1 to be produced. Alternatively, the forming station can be equipped with nozzles with an axial stretching rod.

The pressure of the injected liquid is high, for example comprised between 5 and 40 bars. This high pressure could deform the neck 6 and lead to defects in the formed containers. However, the extension device 14 protects said neck 6 against the deformations by maintaining said neck 6 inside the extension device against the wall 20 of the connection part 16. Furthermore, the extension part 24 of the extension device 14 serves as a guiding means for the injection nozzle 50 which is correctly placed relative to the inner opening 10 of the preform 2 when it is placed in the extension part 24 of the extension device 14.

The extension device 14 is particularly attractive as it prevents water from being spilled outside the preform 2 during the injection in case of hydraulic forming or outside the container when the container is filled downstream of the forming machine. The shoulder 30 further prevents water from leaking between the neck 6 and the connection part 16 of the extension device 14.

When the injection is completed, the nozzle 50 is retrieved from the extension part 24 of the extension device 14. The mold and mold holder now contain an assembly 19 made of a formed container 1 equipped with an extension device 14. The assembly 19 faces a transfer station 58 (FIG. 8), where the mold is opened and the container retrieved from the molding cavity to be transferred to a closing, or capping, station 60 or to a extension device shaping station, in case of hydraulic forming.

Figure 10:
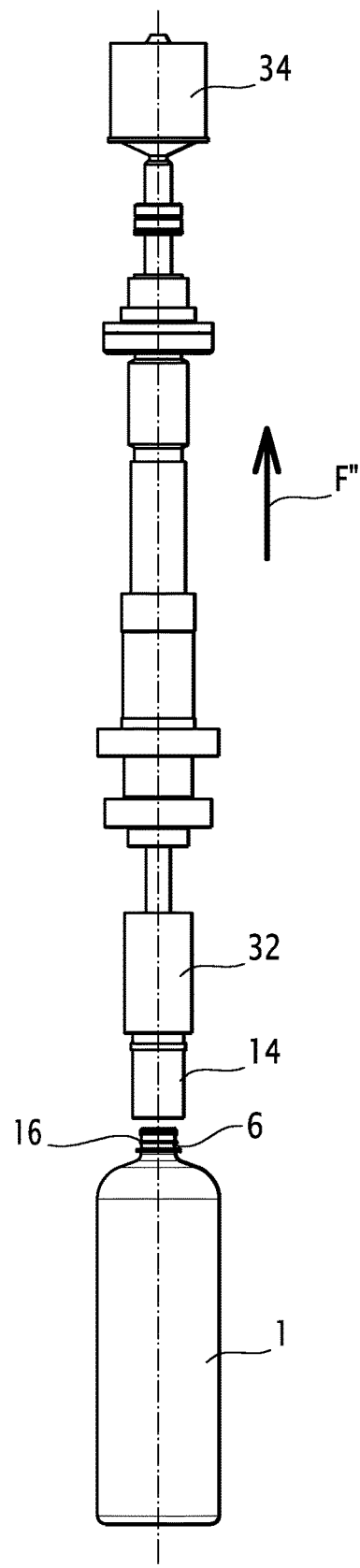
FIG. 10 is a diagrammatical side view of the means to detach an extension device from a container.

According to a first variant of the first embodiment wherein the extension device 14 is replaced by a cap, before reaching the closing or capping station 60, the container is moved to a extension detaching station 62, where the extension device 14 is retrieved from the neck 6 of the container 1. The station comprises means for unscrewing or unclipping the extension device 14 from the neck 6, similar to the means for screwing or clipping the extension device 14 described previously, as shown in FIG. 10. The movement said means are the opposite of the movement performed by the means of the extension attaching station 13, as shown by arrow F" of FIG. 10. The retrieved extension devices 14 are moved to the extension attaching station 13 to be reused on new preforms, as shown by line D of FIG. 8. The container 1 from which an extension device 14 has been detached is moved to the capping station 60. Alternatively, the extension device detaching means could be integrated in the container forming and filling station 46 and not be provided on a distinct station as described above.

According to the second embodiment, the extension device 14 can be retrieved from the neck 6 of the container by actuating the actuator 51, as shown in FIG. 7 and the formed and filled container 1 is retrieved from the neck holding part 49 before being moved the capping station 60, without passing by an extension detaching station.

The capping station 60 is adapted place it by a lid or a cap 64 on the container 1, for example by screwing. The capping station 60 comprises a wheel 66, movable in rotation around an axis substantially parallel to the axis A of the preform 2, i.e. a substantially vertical axis, and a plurality of imprints adapted to receive the formed containers and means for screwing a cap 64 on the neck 6 of each container 1. Such means are known per se and will not be described in detail herein. The capped and filled containers 1 then exit the machine as shown by arrow E of FIG. 8.

Figure 13:
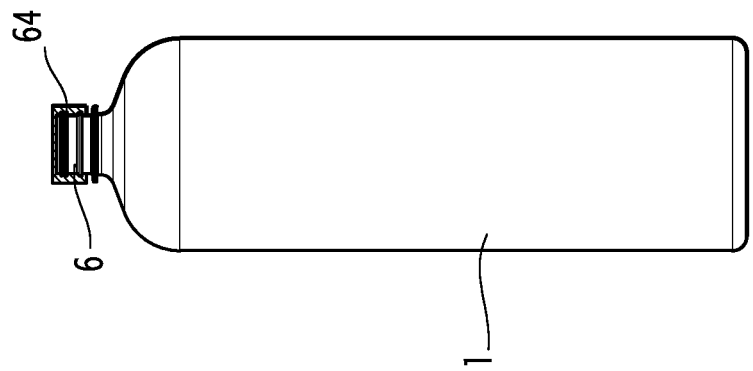
FIGS. 11, 12 and 13 are cross-section views of a container with an extension device during the steps of shaping the extension part of the extension device into a cap closing the container.
Figure 12:
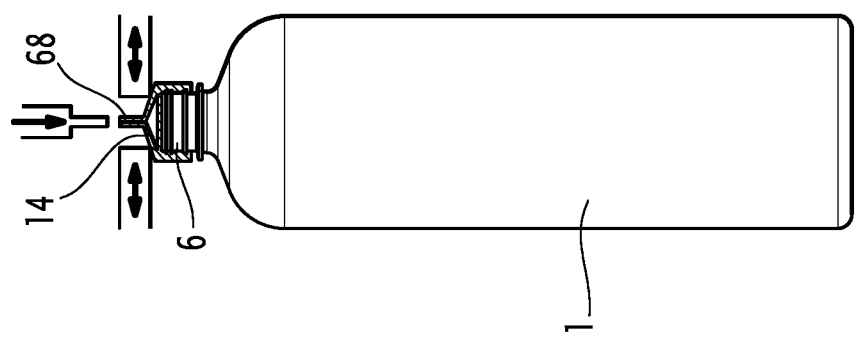
Figure 11:
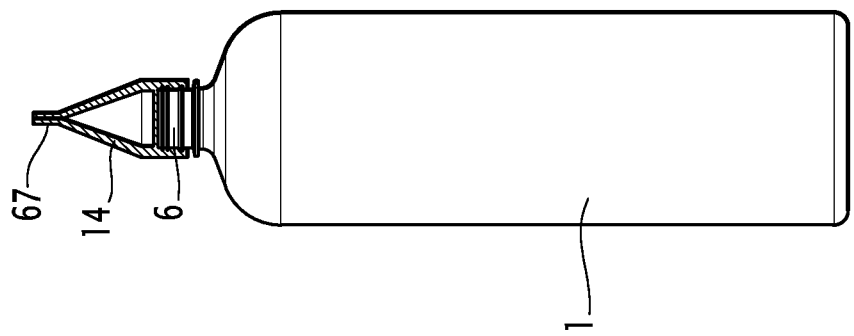

According to a second variant of the first embodiment, shown in FIGS. 11 to 13, the machine does not comprise extension device detaching means and a capping station but means for shaping the extension device 14 into a cap 64.

Such means are for example formed by heating elements arranged to melt the extension part 24 of the extension device 14 such that the extension part 24 is folded on itself and forms a closing edge 67, which can be welded to close the inner opening 26 of the extension part 24, as shown in FIG. 11. Such a shaping of the extension device 14 is possible when the material of the extension device 14 is adapted to be malleable under the action of heat, as described previously. The extension part 24 is then shaped into a cap 64, for example by shrinking and by removing the excess material 68 as shown in FIGS. 12 and 13. Alternatively, the excess material 68 could also be shaped into a handle or into gripping means of the container 2 or into means for hanging the container in a shelf for example.

The means for shaping the extension device 14 can be provided in a dedicated shaping station or integrated in the forming and filling station in case of hydraulic forming or in the filling station in case of air forming.

In this case, the machine for producing the containers 2 can be simplified since there is no need to remove the extension devices 14 from the necks 6 and to move them to the extension attaching station 13 and no need for a capping station 60. In this case, each extension device 14 is used only once and the extension device feeding spot 40 has to be provided with new extension devices 14.

In hydraulic forming, the containers are moved at high speed while containing a liquid. The extension device 14, by extending the length of the neck 6, prevents the liquid from being spilled outside the container 1 when said container 1 is not closed.

More particularly, when the containers 1 are moved in rotation at high speed, the liquid filling the containers is subjected to a centrifugal force, which tends to displace the liquid outside the container 1. Thanks to the extension device, the liquid in maintained in the extension part 24 of the extension device, as shown by line L of FIG. 4, which represents the liquid level when it is subjected to a centrifugal force. Therefore, the liquid is not spilled outside the container 1 even when said container is subjected to high speeds and important centrifugal forces. Consequently, the rotation speeds and transfer speeds of the machine can be increased for improving the throughput of the machine 1.

It should be noted that the preforms and the formed containers can be handled by the extension devices attached to their necks. For example, the preforms and formed containers can be moved from one station to another and can be held in the stations by the extension devices attached to their neck. In this manner, there is no risk of damaging the preforms or the formed containers during their handling in the machine, the preforms and containers being grabbed by the extension devices when needed.

The machine and method described above were given by way of example and various modifications can be foreseen in the machine.

For example, the station for loading the preforms inside the molds can be separated from the container forming station, the mold being displaced between the various stations instead of displacing the preforms and containers alone.

The machine can comprise more stations, such as a station for pre-treating the preforms 2, for example to decontaminate or clean the preforms or a station for retrieving soiled molds from the forming station in case of accidental leaking of a container.

According to an embodiment, the machine comprises a station for cleaning and/or sterilizing the extension devices prior to their attachment to the necks of the preforms. Such a station is for example located upstream of the extension attaching station and downstream of the extension detaching station and is arranged to apply a cleaning and/or sterilizing treatment to the successive extension devices detached from the formed containers and intended to be attached to new preforms.

What is claimed is:

1. A machine for forming containers from preforms, the preforms each having a body and a neck, the neck defining an inner cylindrical opening extending along an axis, the machine comprising:
    a container forming and filling station including an injection nozzle and at least one mold, the injection nozzle being configured to inject a liquid inside the preforms, the at least one mold defining a mold cavity in the shape of the container to be formed and configured to receive the preforms therein such that the injection of the liquid deforms the preforms into a container in the shape of the mold cavity and fills the container;
    a plurality of extension devices, each extension device comprising a connection part and an extension part, the connection part being configured to attach to the neck of a preform, the extension part extending along the axis of the preform and defining an inner opening extending in the continuity of the inner cylindrical opening of the neck when the extension device is attached to the neck of a preform, the extension device and preform defining an assembly when the extension device is attached to the neck of a preform, the injection nozzle being coupled to the extension device and configured to inject the liquid through the inner opening of the extension device in a fluid tight manner; and
    an extension device attaching station configured to attach an extension device on the neck of each preform.

2. The machine according to claim 1, further comprising a wheel movable in rotation and configured to drive in rotation the container forming station, the extension part of the extension device having a length such that the liquid injected in the container is not spilled over the extension part of the extension device under the influence of the centrifugal force imparted on the liquid by the rotation of the wheel, the length of the extension part being greater than a diameter of the inner cylindrical opening.

3. The machine according to claim 1, wherein the extension device attaching station is configured to one of screw, clip, drive fit or interference fit one of the extension devices on the neck of each preforms.

4. The machine according to claim 1, further comprising an extension device detaching station configured to remove the extension device from the neck of the container and configured to move the extension devices between the extension device detaching station and the extension device attaching station.

5. The machine according to claim 4, wherein the extension device detaching station is located downstream of the container forming and filling station.

6. The machine according to claim 1, wherein the extension device attaching station includes a head configured to engage the extension device.

7. The machine according to claim 6, wherein the head is configured to attach the extension devices on the neck of a preforms by one of screw, clip, drive fit or interference fit attachment.

8. The machine according to claim 1, further comprising a plurality of neck holding parts, each neck holding part being arranged to hold the preform or the container by the neck at least during the forming and filling of the container, the extension device attaching station comprising an anti-spilling actuator arranged to move each extension device relative to a corresponding neck holding part between an anti-spilling configuration, wherein the extension device is placed on the neck of a preform, and a retrieved configuration, wherein the extension device is moved away from the neck holding part for retrieving the extension device from the neck of a preform.

9. The machine according to claim 1, wherein the extension attaching station is located upstream of the container forming and filling station.

10. The machine according to claim 1, further comprising a cap forming station, the cap forming station including at least one element configured to shape the extension device into a cap.

11. The machine according to claim 10, wherein the elements include at least one of a heating element, a welding element, a folding element, a shrinking element, a material removal element, a handle shaping element, and a hanger shaping element.

12. An assembly comprising:
    an element, the element being one of a container and a preform, the one of a container and a preform including a neck defining an inner cylindrical opening extending along an axis
    an extension device, the extension device including a connection part and an extension part, the connection part being attached to the neck of the element, the extension part and the connection part cooperating to define a second inner cylindrical opening extending along the axis and in continuity of the inner cylindrical opening of the neck, wherein the length of the extension part along the axis is greater than the diameter of the inner cylindrical opening of the neck.

13. The assembly according to claim 12, wherein the extension device includes a shoulder extending radially inward and provided on the second the inner cylindrical opening at a location between the connection part and the extension part, the shoulder engaging an end of the neck of the element.

14. The assembly according to claim 12, wherein the extension part is delimited by a wall surrounding the inner cylindrical opening, the wall being tapered such that the inner cylindrical opening includes a portion having a conical shape in the extension part.

15. The assembly according to claim 12, wherein the extension part of the extension device is made of a malleable material.

16. The assembly according to claim 15, wherein extension part has a shape configured to be folded and welded on itself.

17. The assembly according to claim 12, wherein at least the extension part of the extension device is made of a hydrophobic material.

18. The assembly according to claim 12, wherein at least the extension part of the extension device is coated with a hydrophobic material.

19. In combination, a machine and assembly for forming containers comprising:
an assembly including a preform and an extension device, the preform having a body and a neck, the neck defining an inner cylindrical opening extending along an axis, the extension device being attached to the preform and including a connection part and an extension part, the connection part being in engagement with the neck of the preform, the extension part extending along the axis of the preform and defining an inner opening extending in the continuity of the inner cylindrical opening of the neck of the preform; and
the machine including a container forming and filling station and an extension device attaching station, the extension device attaching station being configured to attach the extension device onto the neck of the preform thereby forming the assembly, the container forming and filing station including an injection nozzle and at least one mold, the injection nozzle being configured to inject a liquid into the preform through the extension device when coupled to the extension device in a fluid tight manner, the at least one mold defining a mold cavity in the shape of the container to be formed from the preform and being configured to receive the preform therein such that the injection of the liquid deforms the preforms into a container in the shape of the mold cavity and fills the container.

20. The combination of claim 19, further comprising an extension device detaching station, the extension device detaching station being configured to remove the extension device from the neck of the container and configured to move the extension device between the extension device detaching station and the extension device attaching station.

* * * * *